United States Patent [19]

Pauze

[11] 3,865,785

[45] Feb. 11, 1975

[54] POLYESTERAMIDEIMIDES
[75] Inventor: Denis R. Pauze, Scotia, N.Y.
[73] Assignee: General Electric Company, Schenectady, N.Y.
[22] Filed: Dec. 27, 1972
[21] Appl. No.: 318,990

[52] U.S. Cl. ............ 260/75 N, 117/218, 260/33.4 P
[51] Int. Cl. .............................................. C08g 20/30
[58] Field of Search ................................. 260/75 N

[56] References Cited
UNITED STATES PATENTS

| | | | |
|---|---|---|---|
| 3,223,680 | 12/1965 | Kramer | 260/75 |
| 3,274,292 | 9/1966 | Joo et al. | 260/867 |
| 3,458,480 | 7/1969 | Schmidt et al. | 260/75 |
| 3,555,113 | 1/1971 | Sattler | 260/841 |
| 3,668,175 | 6/1972 | Sattler | 260/33.4 |

Primary Examiner—Melvin Goldstein

[57] ABSTRACT

Polyamideimide coating compositions of high solids content and suitably low viscosity are provided which can use cresylic acid-hydrocarbon solvent systems.

3 Claims, No Drawings

POLYESTERAMIDEIMIDES

This invention relates to improved polyamideimides and the process of making such materials. More particularly, the invention relates to such polyamideimide coating compositions which are particularly characterized by high solids content and suitably low viscosity, such compositions using readily available solvent such as cresylic acid-hydrocarbon solvents.

The preparation of polyamideimides by the reaction of tricarboxylic acid material and polyamine is basically well known, such reactions being set forth, for example, in U.S. Pat. No. 3,260,691 where, instead of tricarboxylic acid as such, the monoacid chloride derivative of the anhydride is used. While polyamideimide coating compositions have found wide acceptance in the art, it is necessary in order to provide high solids and suitably low viscosity materials that relatively expensive solvents such as N-methylpyrrolidone, dimethylsulfoxide and the like be used. The use of such relatively expensive solvents along with hydrocarbon solvents provides a wire enamel system having a lower viscosity and high solids content than when, for example, cresylic acid or cresylic acid-hydrocarbon solvent systems are used. It would be most desirable to provide polyamideimide materials which, in combination with the less expensive cresylic acid-hydrocarbon solvent systems provide a coating composition which has a relatively high solids content and suitably low viscosity and it is a primary object of the present invention to provide such materials.

Briefly, according to the present invention it has been found that polyamideimides of the above improved character can be provided by reacting tricarboxylic material with polyamine and aliphatic dicarboxylic acid and polyol, such reaction products being soluble in less expensive cresylic acid and hydrocarbon solvents to provide coating compositions having a relatively high solids contents and suitably low viscosity for easy coating.

Those features of the invention which are believed to be novel are set forth with particularity in the claims appended hereto. The invention will, however, be better understood and further objects and advantages appreciated from a consideration of the following description.

Generally speaking, in the present invention the equivalent ratio of tricarboxylic acid material such as trimellitic anhydride to aliphatic dicarboxylic acid material such as azelaic acid ranges from about 1:3 and 9:1, and is preferably 3:1. The ratio of equivalents of tricarboxylic acid material to polyamine such as methylene dianiline ranges from about 1:4 to 9:10, and is preferably about 3:4. The equivalent ratio of polyamine such as methylene dianiline to glycol such as ethylene glycol ranges from about 99:1 to 4:1 and most preferably is about 9:1. Generally, the ingredients are reacted at 190°C to 250°C until the desired carboxyl content is reached which is about 2.5 to 2.7 percent. The glycol is added when the tricarboxylic acid material, aliphatic acid and polyamine have been reacted to the desired carboxyl content. The tricarboxylic acid and aliphatic acid can be added together or separately to the polyamine.

While trimellitic anhydride is preferred as the tricarboxylic acid material, any of a number of suitable tricarboxylic acid constituents will occur to those skilled in the art including 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene-3,3',4-tricarboxylic anhydride; 3,4,10-preylene tricarboxylic anhydride; 3,4-dicarboxyphenyl 3-carboxyphenyl ether anhydride; ethylene tricarboxylic anhydride; 1,2,5-naphthalene tricarboxylic anhydride; 1,2,4-butane tricarboxylic anhydride; etc. The tricarboxylic acid materials can be characterized by the following formula:

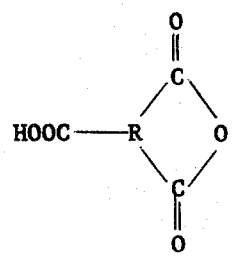

where R is a trivalent organic radical.

The aromatic polyamines useful in connection with the present invention are well known and may be expressed by the formula $$X-R'-(NH_2)_n$$

where R' is a diorgano radical, for example, a heterocyclic radical, an alkylene radical, an arylene radical having from 6 to 15 carbon atoms and YGY, where Y is arylene, such as phenylene, toluene, anthrylene, arylenealkylene, such as phenyleneethylene, etc.; G is a divalent organo radical selected from alkylene radicals having from 1 to 10 carbon atoms,

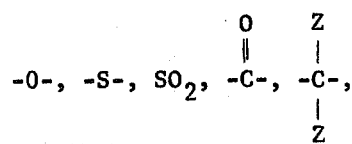

where Z is selected from methyl and trihalomethyl such as trifluoromethyl, trichloromethyl, etc., n is at least 2 X is hydrogen, an amino or organic group such as alkylene, arylene, etc. including those also containing at least one amino group. Among the specific amines useful for the present invention, alone or in admixture, are the following:

4,4-diamino-2,2'-sulfone diphenylmethane
ethylenediamine
benzoguanamine
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diphenyl silane bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
polymethylene polyamine (Curithane) and mixtures thereof.

The aliphatic dicarboxylic acid material, saturated or unsaturated, of the present invention can have up to about forty carbon atoms in the chain, such materials being illustrated by adipic acid, sebacic acid, azelaic acid, suberic acid, pimelic, oxalic, maleic, succinic, glutaric and dodecanedioic acid and fumaric acid. The anhydrides can be used.

Any of a number of diols or glycols having the general formula

$$OH-(R'')-OH$$

can be used where $m$ ranges typically from about 2 through 12 or higher and $R''$ is preferably, although not necessarily, an alkylene group. Among such diols or glycols are ethylene glycol, propanediols, butanediols, pentanediols and hexanediols, octanediols, etc. Ethylene glycol is preferred.

As pointed out above, cresylic acid is the preferred aromatic solvent used in connection with the present invention. Used in connection with the cresylic acid are any of a number of hydrocarbon solvents including Solvesso 100 which is a mixture of mono-, di- and trialkyl (primarily methyl) benzenes having a flash point of about 113°F and a distillation range of from about 318°F to 352°F, such solvent being made by the Humble Oil Company. Another solvent useful in the present connection is Humble 670 solvent, a mixture of mono-, di-, and trialkyl (primarily methyl) benzenes having a gravity API 60°F of 31.6 percent, specific gravity at 60°F of 0.8676, a mixed aniline point of 11°F and a distillation range of about 288°F to 346°F.

The following examples illustrate the practice of the present invention, it being realized that they are not to be taken as limiting in any way. All parts and percentages are by weight unless otherwise specifically indicated.

EXAMPLE 1

A vessel equipped with thermometer, Dean Stark trap, stirrer, condenser, addition inlet and nitrogen inlet was charged with 211.5 parts azelaic acid, 648 parts trimellitic anhydride, 892 parts methylene dianiline, 1 part tetraisopropyl titanate and 1227 parts of a solvent consisting of 55 parts cresylic acid and 45 parts phenol. The contents, which can, generally speaking, be heated to a temperature of 180° to 250°C were heated to a temperature of from 200° to 205°C, water being collected and the temperature maintained until a carboxyl content of 3.4 was reached. Then 3070 additional parts of the above cresylic acid solvent were added, heating being continued at about 200°C until the carboxyl percent was about 1.8. At this point, 40 parts of ethylene glycol were added and a temperature of approximately 200°C maintained until the percent carboxyl was 0.55. The contents were then diluted to approximately 25 percent solids using a solvent consisting of 75 percent cresylic acid and 25 percent Solvesso 100 hydrocarbon. The Gardner-Holt viscosity was Z 13/4 or about 3400 centistokes at 25°C.

EXAMPLE 2

There were charged into a vessel similar to that of Example 1, 166 parts of the above cresylic acid solvent, 35 parts azelaic acid, 108 parts trimellitic anhydride, 134 parts methylene dianiline, 1 part tetraisopropyl titanate and 30 parts of toluene, the contents being heated to approximately 200°C until a 2.66 percent carboxyl content was obtained. Then ten parts of ethylene glycol were added, the temperature being maintained at 200°C until the percent carboxyl content was 0.47. At this point 416 parts of the above cresylic acid solvent were added along with 196 parts of Solvesso 100 hydrocarbon solvent. The final solids content was 25.3 and the Gardner-Holt vicosity X ¾ or about 1634 centistokes at 25°C.

EXAMPLE 3

To a vessel such as that of Example 1 there were charged 166 parts of the above cresylic acid solvent, 35 parts azelaic acid, 108 parts trimellitic anhydride, 134 parts methylene dianiline, 1 part tetraisopropyl titanate and 30 parts toluene. The materials were heated to about 200°C to a percent carboxyl content of 2.64. At this point 20 parts of ethylene glycol were added and heating continued at about 200°C to a percent carboxyl content of 0.32. At this point 474 parts of the above cresylic acid solvent were added along with 200 parts of Solvesso 100. The final solids content was 25.8 and the Gardner-Holt viscosity V½, or about 978 centistokes at 25°C.

Shown in Table I below are the results of actual wire coating tests using the compositions of Example 1, 2 and 3 as an overcoating of the indicated build over a base coat of polyester 2.2 mils thick placed on copper magnet wire 0.0403 inch in diameter, the wire being cured in a 15 foot tall wire tower having a bottom temperature of 245°C and a top temperature of about 400°C. The specific polyester wire enamel was Isonel 200E manufactured by Schenectady Chemicals. Briefly, this enamel is described in U.S. Pat. Nos. 2,936,296 and 3,201,276 and is a tris(2-hydroxyethyl-)isocyanurate (THIC) modified polyester derived from dimethyl terephthalate and ethylene glycol, the THIC being used in place of glycerine. The base coat for Example 1 was a commerical polyesterimide, specifically Imidex polyesterimide made by General Electric Company. The wires were visually inspected for smoothness in the usual manner and tested for flexural strength at 25 percent elongation for heat shock at 220°C after having been stretched 20 percent and for burnout which is an indication of the resistance to high temperature in the winding of a stalled motor. Such tests are well known in the art and are described, for example, U.S. Pat. Nos. 2,936,296; '3,297,785; and 3,555,113 and elsewhere. Specifically, the flexibility of the coatings were determined by stretching the coated electrical conductor 25 percent of its original length and winding it about a stepped mandrel having diameters of one, two and three times the wire diameter, the smallest mandrel diameter at which failure does not occur being taken as the test point. Heat shock is measured by prestretching wire samples to elongation of 20 percent and winding the wire so stretched on a conical mandrel having a diameter ranging from 0.7 to ten times the diameter of the bar wire and having an apex angle of about 20°, removing the conical shaped coil of wire from the mandrel and placing it in an air circulating oven at the indicated temperature for ½ hour and taking the arithmetical average of five coils measured at the largest diameter at which cracking appears, this diameter being expressed as the inside of the coil divided by the diameter of the wire.

TABLE I

| Topcoat | Example 1 | Example 2 | Example 3 |
|---|---|---|---|
| Basecoat | Polyester-imide | Polyester | Polyester Isonel 200E |
| Speed (ft./min.) | 50 | 50 | 50 |
| Solids Content (%) | 25% | 25.3 | 25.8 |
| Smoothness | B | B | B–B+ |
| Build (mils) | 2.9 | 3.0 | 3.1 |
| Flex, 25% + ?X | 3 | 1 | 1 |
| Diss. Factor, 210°C | 4.5 | 6.3 | 5.0 |
| Cut-Thru, 2000 gms | 350 | 390 | 360 |
| Heat Shock, 20%, 30°, 220°C | 5X | 1X | 2X |
| Burnout (OFM) | 6.8 | 6.7 | 7.4 |

Shown in Table II below are the results of wire coating tests carried out similar to those of Table I, using the composition of Example 2 as an overcoat over the abovementioned polyester base coat, the build of the base coat being 2.2 mils and the build of the overcoat being as indicated in the table.

TABLE II

| | Ex. 4 | Ex. 5 | Ex. 6 | Ex. 7 |
|---|---|---|---|---|
| Overcoat | Ex. 2 | Ex. 2 | Ex. 2 | Ex. 2 |
| Coating speed | 60 | 55 | 50 | 45 |
| Smoothness | B to B+ | B to B+ | B to B+ | B to B+ |
| Build | 3.1 | 3.0 | 3.0 | 2.9 |
| Flex (tower) 25%+ | 1X | 1X | 1X | 1X |
| Continuity, Ft. (3000 volts) | 0–200 | 0–200 | 0–200 | 0–200 |
| Diss. factor, 210°C | 48.4 | 17.1 | 6.1 | 2.6 |
| H.S. 20% 30', 220°C | 2X(1) | 1X | 3X | 2X |
| Diel. (KV) | 11.3 | 9.8 | 10.7 | 10.8 |
| Burnout, CFM | 6.67 | 7.51 | 7.16 | 6.02 |
| Heat Shock 20%, 30 Min., 240°C | 2X(1) | 3X(1) | 3X(1) | 3X F |
| Cut Thru, °C 2000 gm | 300–370 | 345–355 | 370–380 | 370–380 |

From the above table it will be quite evident that the coating compositions of the present invention provide coated magnet wire of desirable characteristics. Not only are the coating compositions provided by the present invention particularly suitable from the point of view of the characteristics discussed above but they are particularly tenacious and maintain their integrity on the wire even after cycling through fluorochlorinated hydrocarbons or refrigerants as illustrated by Freon R-22 manufactured by duPont. Wires coated as in Example 6 above were subjected to 10 cycles of exposure to the above fulorocarbon hydrocarbon at 70°C. In testing the coated wires were twisted together, stress released for one hour at 150°C and placed in an empty test bomb which was cooled to approximately 0°C. The bomb was then removed and charged with 4.7 lb. of the R-22 Freon and placed in a water bath at 70°C, the pressure being stabilized at 600 ± 50 psi pressure. The bomb was returned to 0°C, the elevation to 70°C and back to 0°C being taken as one cycle. After the desired number of cycles, in this case five, the bomb was opened and the wires heat-treated at 200°C for fifteen minutes. In testing for actual adhesion, a 1 foot sample of wire was heat treated at 150°C for fifteen minutes and an 8 inch length twisted until a break to the copper appeared.

Shown in Table III below are the results of such twist or adhesion tests, the materials of Example 8, 9 being those of Example 2 above. Example 10 represents a commercially available n-methylpyrollidone soluble polyamideimide wire enamel treated in the same way was the others and used as an overcoat over the same base coat.

TABLE III

| | Twist Before Break Cycle Number | | | | |
|---|---|---|---|---|---|
| Example | 1 | 2 | 3 | 4 | 5 |
| 8 | 10 | 13 | 15 | 10 | 15 |
| 9 | 9 | 13 | 6 | 6 | 15 |
| 10 | 5 | 8 | 8 | 7 | 5 |

It will be quite evident from the above results that the coating composition of the present invention has much better adhesion than the prior art material of Example 10.

There are provided, then, by the present invention polyamideimide wire enamels which are soluble in low cost solvents to a high solids content and suitably low coating viscosity and at the same time are equivalent to or superior to prior art materials.

What I claim as new and desire to secure by letters patent of the United States is:

1. The reaction product of (1) the reaction product of tricarboxylic acid material having the formula

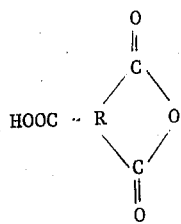

where R is a trivalent radical; material selected from aliphatic dicarboxylic acid and dicarboxylic acid anhydride and polyamine having the formula $$X—R'—(NH_2)_n$$

where R' is a diorgano radical and n is at least 2 and (2) glycol having the formula $$OH+R''+OH$$

where $m$ ranges from about 2 to 12 and R'' is alkylene wherein the ratio of tricarboxylic acid material to material selected from aliphatic dicarboxylic acid and dicarboxylic acid anhydride ranges from about 1:3 to 9:1, the ratio of equivalents of tricarboxylic acid material to polyamine ranges from about 1:4 to 9:10, and the equivalent ratio of polyamine to glycol ranges from about 99:1 to 4:1.

2. The product of claim 1 in which said tricarboxylic acid material is trimellitic anhydride, the aliphatic dicarboxylic acid material is azelaic acid, the polyamine is methylene dianiline, and the glycol is ethylene glycol.

3. The process of making a polyamideimide coating composition which comprises reacting tricarboxylic acid material, polyamine and aliphatic dicarboxylic acid material and further reacting therewith glycol, the proportions of ingredients being as in claim 1.

* * * * *

UNITED STATES PATENT OFFICE
CERTIFICATE OF CORRECTION

PATENT NO. : 3,865,785
DATED : Feb. 11, 1975
INVENTOR(S) : Denis R. Pauze

It is certified that error appears in the above-identified patent and that said Letters Patent are hereby corrected as shown below:

Column 3, lines 48 and 49, correct the formula by adding a sub --m-- after the second parentheses.

Column 8, lines 2 and 3, correct the formula by adding a sub --m-- after the second parentheses.

Signed and sealed this 29th day of April 1975.

(SEAL)
Attest:

RUTH C. MASON
Attesting Officer

C. MARSHALL DANN
Commissioner of Patents
and Trademarks